United States Patent
Li et al.

(10) Patent No.: US 9,632,193 B2
(45) Date of Patent: Apr. 25, 2017

(54) COMPRESSIVE SENSING

(71) Applicant: CONOCOPHILLIPS COMPANY, Houston, TX (US)

(72) Inventors: Chengbo Li, Houston, TX (US); Sam T. Kaplan, Oakland, CA (US); Charles C. Mosher, Houston, TX (US); Joel D. Brewer, Houston, TX (US); Robert G. Keys, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 175 days.

(21) Appl. No.: 14/529,690

(22) Filed: Oct. 31, 2014

(65) Prior Publication Data

US 2015/0124560 A1 May 7, 2015

Related U.S. Application Data

(60) Provisional application No. 61/898,960, filed on Nov. 1, 2013.

(51) Int. Cl.
  *G01V 1/30* (2006.01)
  *G01V 1/00* (2006.01)
  *G01V 1/36* (2006.01)

(52) U.S. Cl.
  CPC ............... *G01V 1/30* (2013.01); *G01V 1/003* (2013.01); *G01V 1/36* (2013.01);
  (Continued)

(58) Field of Classification Search
  CPC . G01V 1/30; G01V 1/36; G01V 1/003; G01V 2210/60; G01V 2210/169; G01V 2210/614; G01V 2210/57
  (Continued)

(56) References Cited

U.S. PATENT DOCUMENTS

2004/0172199 A1  9/2004  Chavarria et al.
2008/0225642 A1  9/2008  Moore et al.
(Continued)

OTHER PUBLICATIONS

Herrmann et al., "Non-parametric seismic data recovery with curvelet frames," Geophys. J. Int. (2008) 173, 233-248.*
(Continued)

*Primary Examiner* — Daniel L Murphy
(74) *Attorney, Agent, or Firm* — ConocoPhillips Company

(57) ABSTRACT

Computer-implemented method for determining optimal sampling grid during seismic data reconstruction includes: a) constructing an optimization model, via a computing processor, given by $\min_u \|Su\|_1$ s.t. $\|Ru-b\|_2 \leq \sigma$ wherein S is a discrete transform matrix, b is seismic data on an observed grid, u is seismic data on a reconstruction grid, and matrix R is a sampling operator; b) defining mutual coherence as $$\mu \leq \sqrt{\frac{C}{S} \frac{m}{(\log n)^6}},$$

wherein C is a constant, S is a cardinality of Su, m is proportional to number of seismic traces on the observed grid, and n is proportional to number of seismic traces on the reconstruction grid; c) deriving a mutual coherence proxy, wherein the mutual coherence proxy is a proxy for mutual coherence when S is over-complete and wherein the mutual coherence proxy is exactly the mutual coherence when S is a Fourier transform; and d) determining a sample grid $r_* = \arg\min_r \mu(r)$.

6 Claims, 14 Drawing Sheets

(52) U.S. Cl.
CPC .... *G01V 2210/169* (2013.01); *G01V 2210/57* (2013.01); *G01V 2210/60* (2013.01); *G01V 2210/614* (2013.01)

(58) Field of Classification Search
USPC .......................................................... 367/14
See application file for complete search history.

(56) References Cited

U.S. PATENT DOCUMENTS

2011/0307438 A1    12/2011   Fernandez Martinez
2012/0082207 A1*   4/2012    Jiang ...................... H04N 19/30
                                                      375/240.2

OTHER PUBLICATIONS

International Search Report Dated Feb. 9, 2015. PCT/US2014/063443.
Gilles et al. Application of stable signal recovery to seismic data interpolation Gilles Hennenfent* and Felix J. Herrmann Earth & Ocean Sciences Department. University of British Columbia. 2006.

* cited by examiner

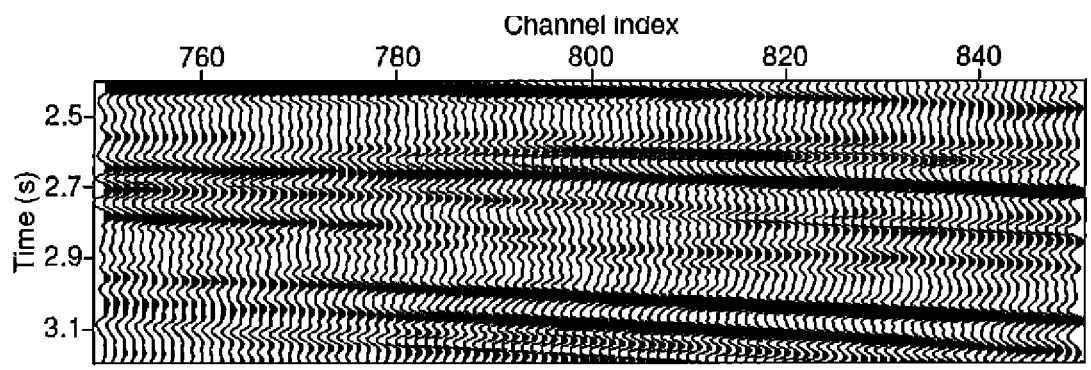
FIG. 3 (a)
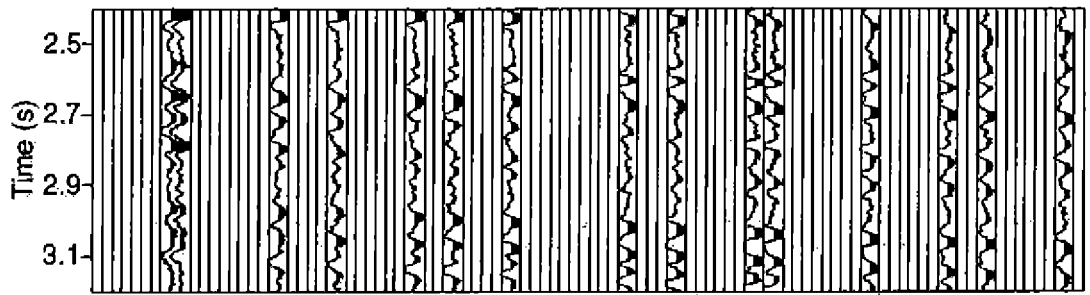
FIG. 3 (b)
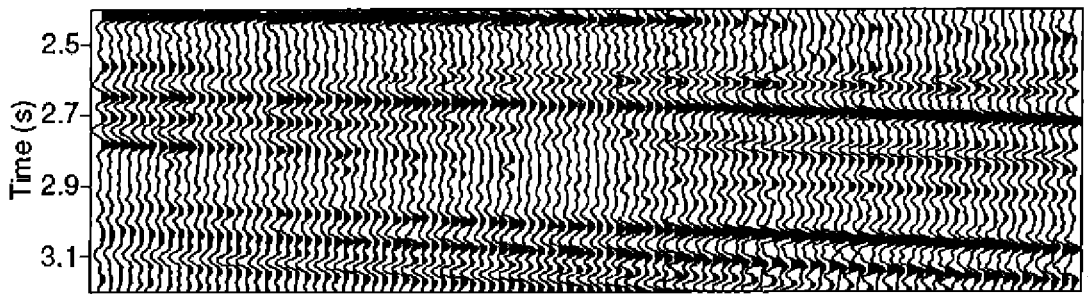
FIG. 3 (c)
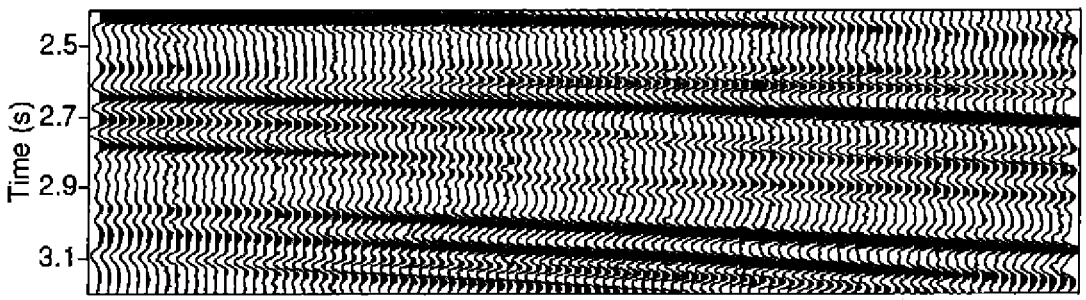
FIG. 3 (d)
FIGS. 3a-3d

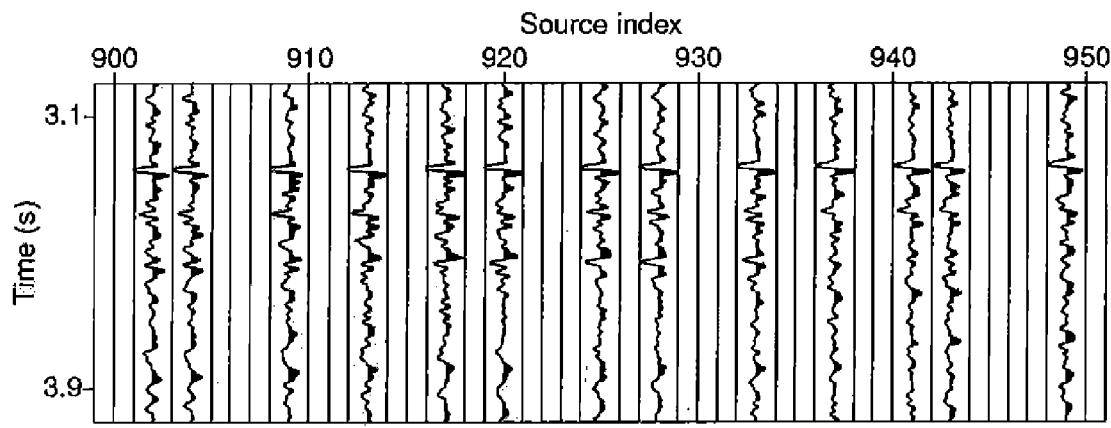
FIG. 4 (a)
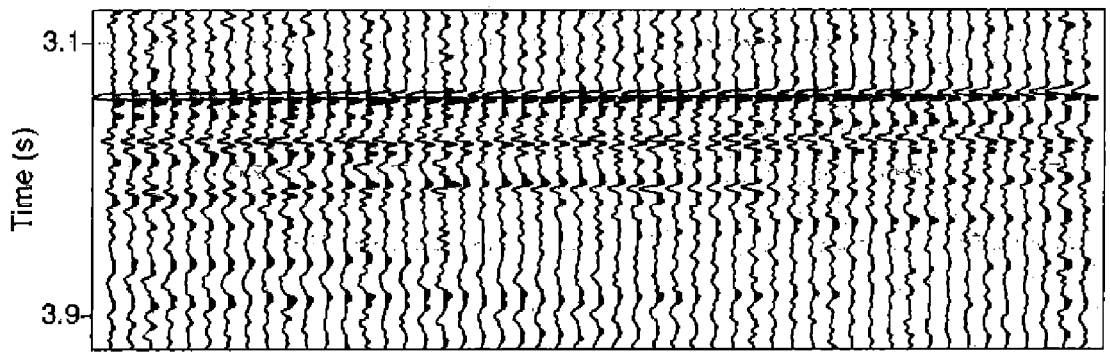
FIG. 4 (b)
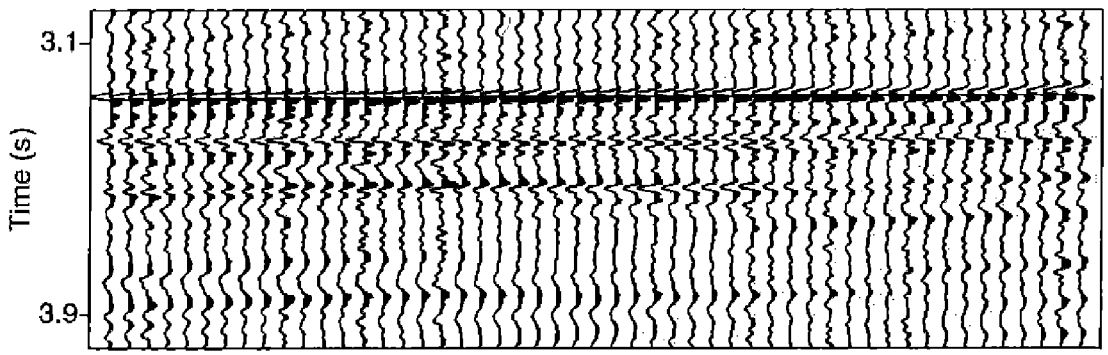
FIG. 4 (c)
FIGS. 4a-4c

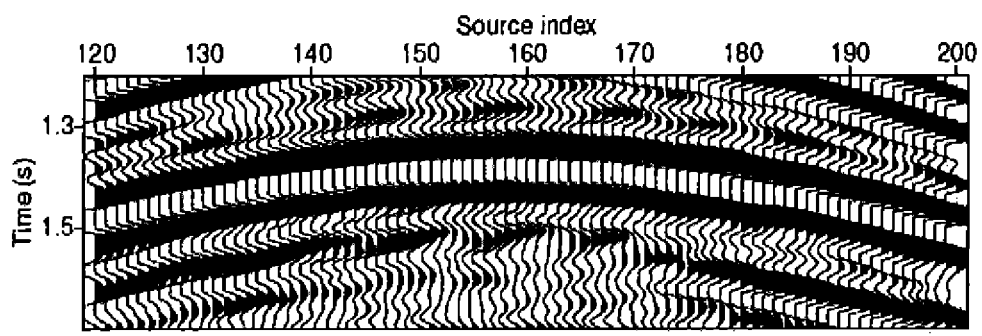
FIG. 7 (a)
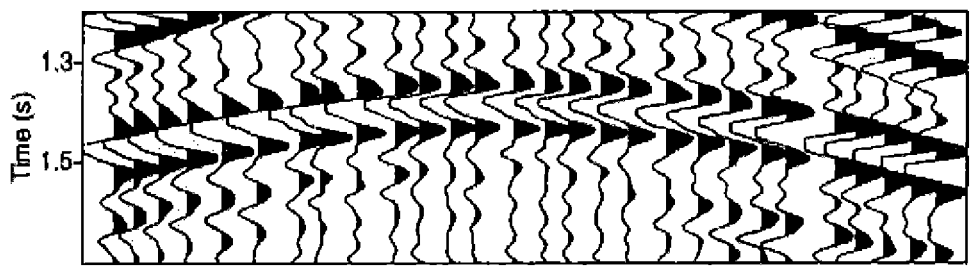
FIG. 7 (b)
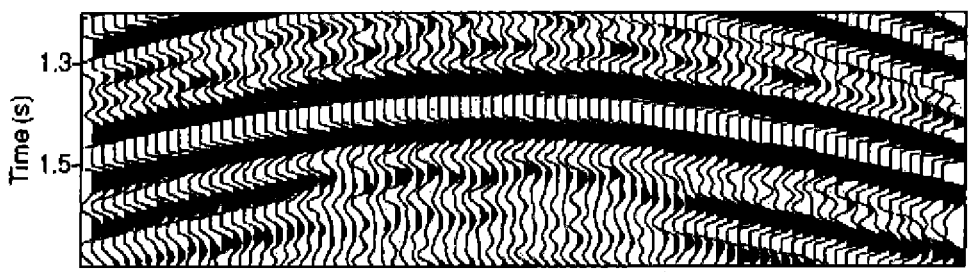
FIG. 7 (c)
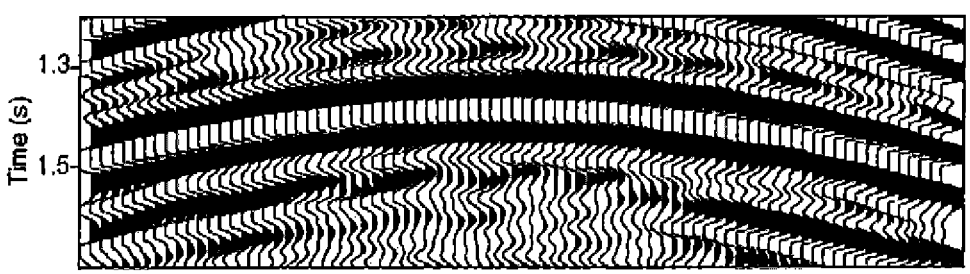
FIG. 7 (d)
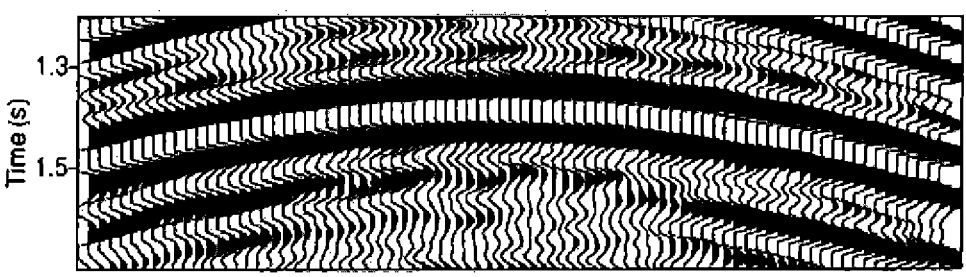
FIG. 7 (e)
FIGS. 7a-7e

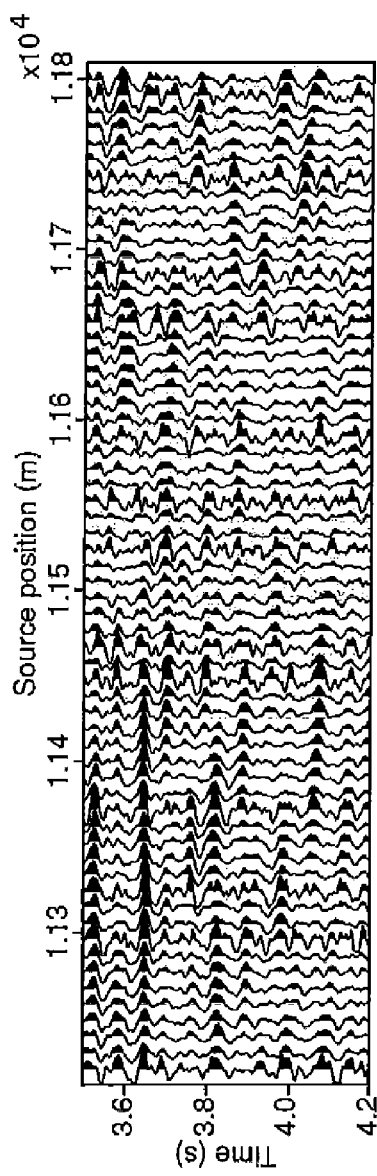
FIG. 10 (a)
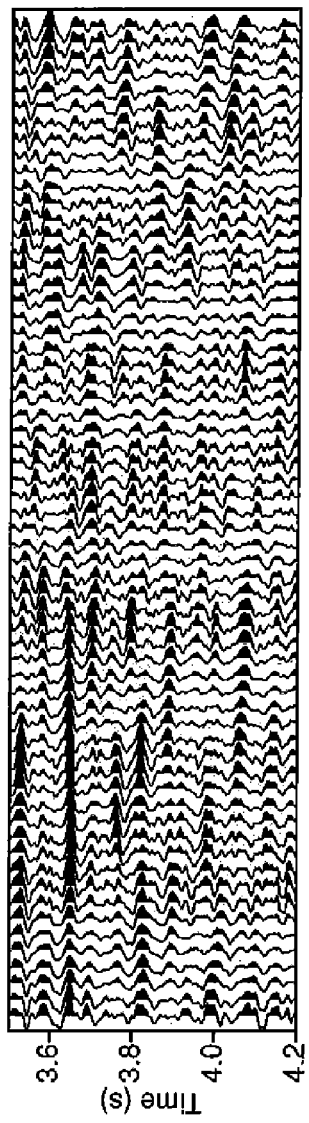
FIG. 10 (b)
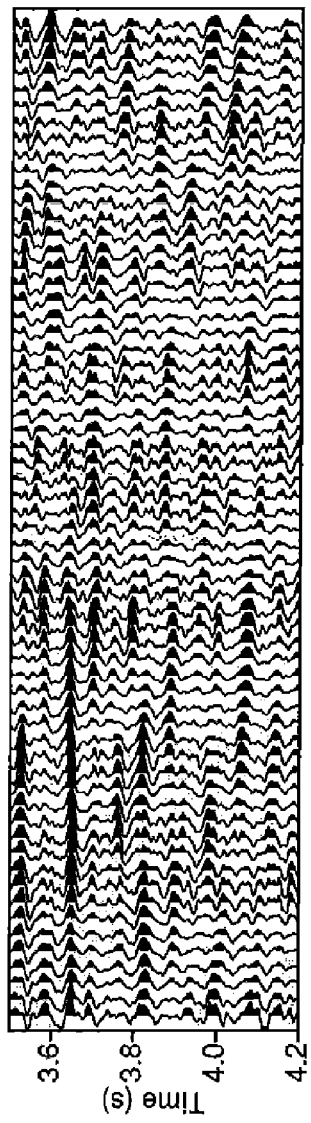
FIG. 10 (c)
FIGS. 10a-10c

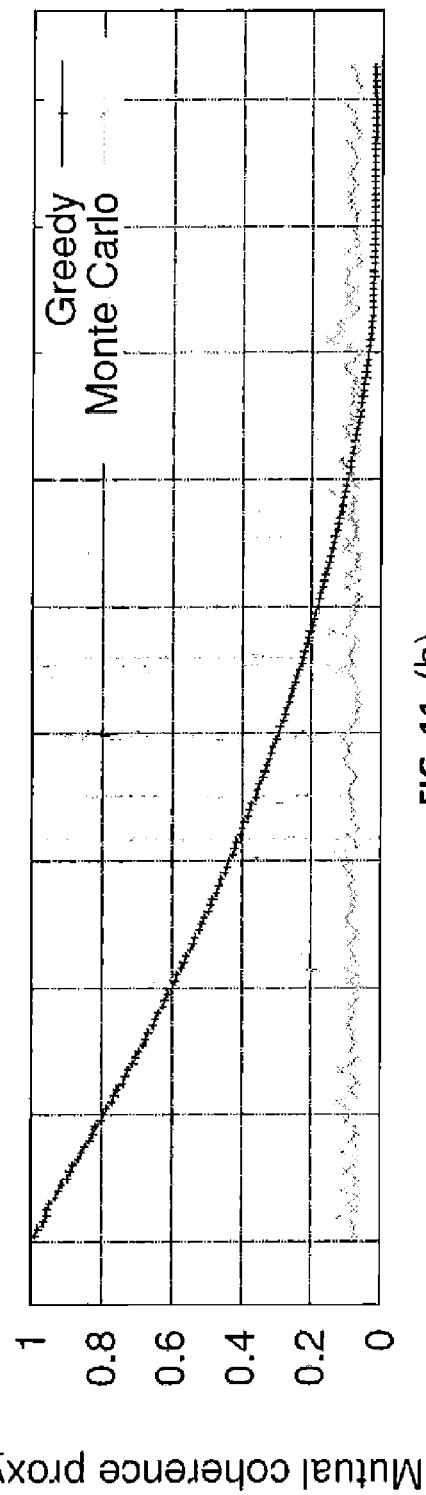
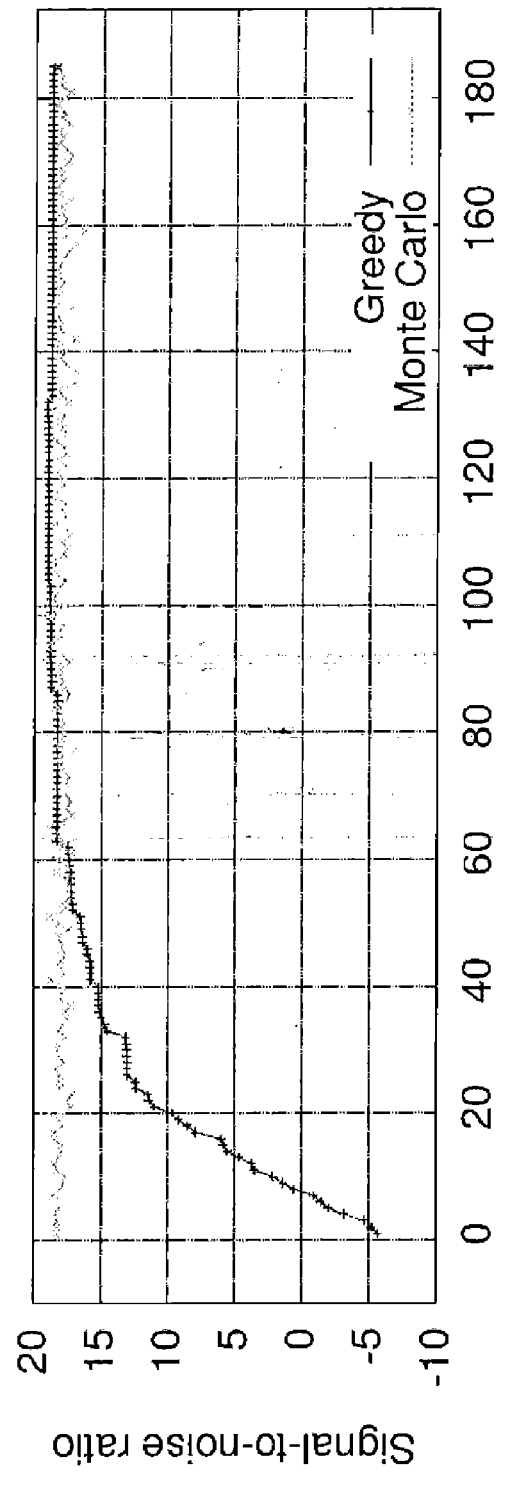
FIG. 11 (a)
FIG. 11 (b)
FIGS. 11a-11b

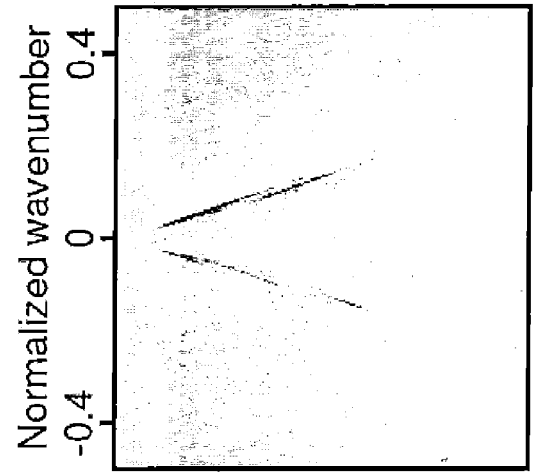
FIG. 13 (a)
FIG. 13 (b)
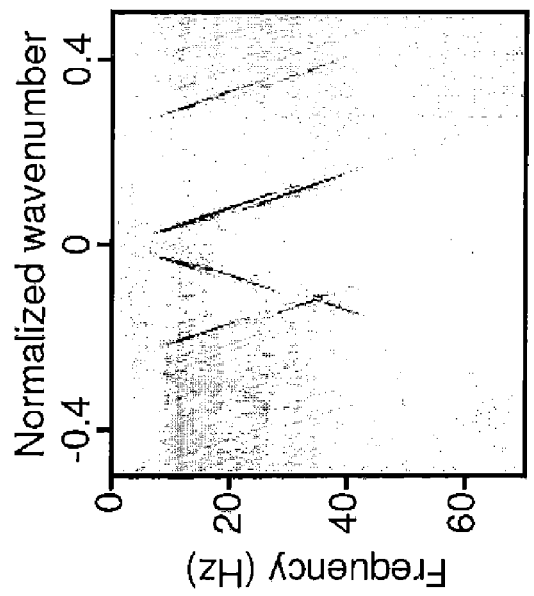
FIG. 13 (c)
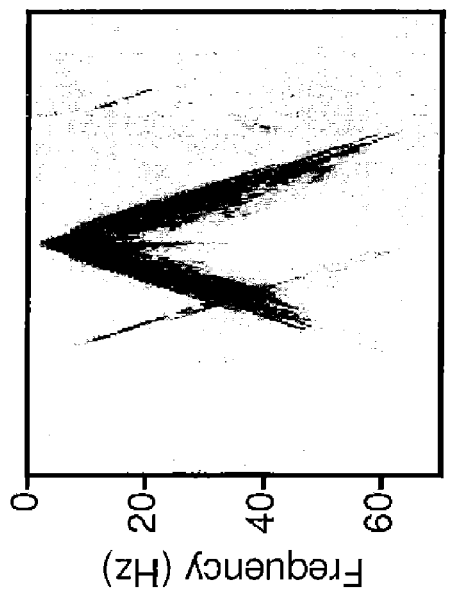
FIG. 13 (d)
FIGS. 13a-13d

COMPRESSIVE SENSING

CROSS-REFERENCE TO RELATED APPLICATIONS

This application is a non-provisional application which claims the benefit of and priority to U.S. Provisional Application Ser. No. 61/898,960 filed Nov. 1, 2013, entitled "Compressive Sensing," which is hereby incorporated by reference in its entirety.

FIELD OF THE INVENTION

The present invention relates generally to seismic imaging. More particularly, but not by way of limitation, embodiments of the present invention include tools and methods for processing seismic data by compressive sensing.

BACKGROUND OF THE INVENTION

Seismic imaging typically involves not only acquiring seismic data but processing the acquired seismic data. In some cases, processing requires recovering missing pieces of information from irregularly acquired seismic data. Irregularities may be caused by, for example, dead or severely corrupted seismic traces, surface obstacles, acquisition apertures, economic limits, and the like. Certain seismic processing techniques may be employed to spatially transform irregularly acquired seismic data to regularly sampled data that is easier to interpret. This regularization can involve a number of processing techniques such as interpolation and reconstruction of seismic data.

In recent years, compressive sensing theories have gained traction. One application of compressive sensing in geophysics involves seismic data reconstruction (e.g., Hennenfent and Herrmann, 2008). As an overview, compressive sensing provides conditions for when an under-determined system of equations has a desirable solution. A seismic data reconstruction problem (e.g. Stolt, 2002; Trad, 2003; Liu and Sacchi, 2004; Abma and Kabir, 2006; Ramirez et al., 2006; Naghizadeh and Sacchi, 2007; Xu et al., 2010; Kaplan et al., 2010) provides a coarse set of observed traces along with a desired set of fine spatial grid points upon which data is reconstructed. Compressive sensing theory can address such issues as 1) how many observations need to be collected, 2) where the observations should be made (i.e., sampling grid) with respect to the reconstruction grid, and 3) what mathematical dictionary (e.g., mutual coherence) should be used to represent the reconstructed data. While mutual coherence is an important metric in compressive sensing theory, it can also be expensive to compute. Descriptions and/or overviews of seismic data reconstruction can also be found in Trad, 2003; Liu and Sacchi, 2004; Abma and Kabir, 2006; Naghizadeh and Sacchi, 2007; Xu et al., 2010, the relevant parts of which are hereby incorporated by reference.

Certain data reconstruction techniques have been developed, which provide a sparse representation of reconstructed data. For example, Liu and Sacchi (2004) promote a sparse solution in wave-number domain using a penalty function constructed from inverse power spectrum of the reconstructed data. In compressive sensing, it is common to apply an $l_1$ norm to promote some sparse representation of the reconstructed data. The $l_1$ norm has become of particular interest due to its relation to the $l_0$ norm which is a count of the number of non-zero elements. Theorems provide conditions for exact recovery of the reconstructed data and which, in part, rely on relationship between the $l_1$ and $l_0$ norms, and use of the $l_1$ norm in a convex optimization model (Candes et al., 2006). At least one theory of compressive sensing indicates that a sparse or compressible signal can be recovered from a small number of random linear measurements by solving a convex $l_1$ optimization problem (e.g. Baraniuk, 2007).

Compressive sensing can also provide new opportunities for survey design using an irregular sampling grid (e.g. Hennenfent and Herrmann, 2008; Kaplan et al., 2012) instead of a traditional regular grid in order to increase bandwidth and reduce cost. Generally, irregular survey design based on compressive sensing can be summarized by the following steps: 1) determine a nominal regular grid for survey area, 2) choose a subset of locations from this nominal grid in a random or randomly jittered (Hennenfent and Herrmann, 2008) fashion, 3) acquire seismic data based on chosen locations, and 4) reconstruct the data back to the original nominal grid. This approach is applicable to both shot and receiver dimensions.

In certain cases, compressive sensing using irregular acquisition grids can be used to recover significantly broader spatial bandwidth than could be obtained using a regular sampling grid. Recovered bandwidth is primarily determined according to the spacing of nominal grid for reconstruction. If a predefined nominal grid is too coarse, the reconstructed seismic data may still be aliased; if the predefined nominal grid is too fine, the time and cost savings of irregular versus regular survey design may become insignificant. In general, if there is a lack of prior information about a given survey area, then it may not be feasible to select a proper nominal grid beforehand.

BRIEF SUMMARY OF THE DISCLOSURE

The present invention relates generally to seismic imaging. More particularly, but not by way of limitation, embodiments of the present invention include tools and methods for processing seismic data by compressive sensing.

Compressive sensing theory is utilized for seismic data reconstruction. Compressive sensing, in part, requires an optimization model. Two classes of optimization models, synthesis- and analysis-based optimization models, are considered. For the analysis-based optimization model, a novel optimization algorithm (SeisADM) is presented. SeisADM adapts the alternating direction method with a variable-splitting technique, taking advantage of the structure intrinsic to the seismic data reconstruction problem to help give an efficient and robust algorithm. SeisADM is demonstrated to solve a seismic data reconstruction problem for both synthetic and real data examples. In both cases, the SeisADM results are compared to those obtained from using a synthesis-based optimization model. Spectral Projected Gradient L1 solver (SPGL1) method can be used to compute the synthesis-based results. Through both examples, it is observed that data reconstruction results based on the analysis-based optimization model are generally more accurate than the results based on the synthesis-based optimization model. In addition, for seismic data reconstruction, the SeisADM method requires less computation time than the SPGL1 method.

Compressive sensing can be successfully applied to seismic data reconstruction to provide a powerful tool that reduces the acquisition cost, and allows for the exploration of new seismic acquisition designs. Most seismic data reconstruction methods require a predefined nominal grid for reconstruction, and the seismic survey must contain observations that fall on the corresponding nominal grid points. However, the optimal nominal grid depends on many factors, such as bandwidth of the seismic data, geology of the survey area, and noise level of the acquired data. It is understandably difficult to design an optimal nominal grid when sufficient prior information is not available. In addition, it may be that the acquired data contain positioning errors with respect to the planned nominal grid. An interpolated compressive sensing method is presented which is capable of reconstructing the observed data on an irregular grid to any specified nominal grid, provided that the principles of compressive sensing are satisfied. The interpolated compressive sensing method provides an improved data reconstruction compared to results obtained from some conventional compressive sensing methods.

Compressive sensing is utilized for seismic data reconstruction and acquisition design. Compressive sensing theory provides conditions for when seismic data reconstruction can be expected to be successful. Namely, that the cardinality of reconstructed data is small under some, possibly over-complete, dictionary; that the number of observed traces are sufficient; and that the locations of the observed traces relative to that of the reconstructed traces (i.e. the sampling grid) are suitably chosen. If the number of observed traces and the choice of dictionary are fixed, then choosing an optimal sampling grid increases the chance of a successful data reconstruction. To that end, a mutual coherence proxy is considered which is used to measure how optimal a sampling grid is. In general, the computation of mutual coherence is prohibitively expensive, but one can take advantage of the characteristics of the seismic data reconstruction problem so that it is computed efficiently. The derived result is exact when the dictionary is the discrete Fourier transform matrix, but otherwise the result is a proxy for mutual coherence. The mutual coherence proxy in a randomized greedy optimization algorithm is used to find an optimal sampling grid, and show results that validate the use of the proxy using both synthetic and real data examples.

One example of a computer-implemented method for determining optimal sampling grid during seismic data reconstruction includes: a) constructing an optimization model, via a computing processor, given by $\min_u \|Su\|_1$ s.t. $\|Ru-b\|_2 \leq \sigma$ wherein S is a discrete transform matrix, b is seismic data on an observed grid, u is seismic data on a reconstruction grid, and matrix R is a sampling operator; b) defining mutual coherence as $$\mu \leq \sqrt{\frac{C}{S} \frac{m}{(\log n)^6}},$$

wherein C is a constant, S is a cardinality of Su, m is proportional to number of seismic traces on the observed grid, and n is proportional to number of seismic traces on the reconstruction grid; c) deriving a mutual coherence proxy, wherein the mutual coherence proxy is a proxy for mutual coherence when S is over-complete and wherein the mutual coherence proxy is exactly the mutual coherence when S is a Fourier transform; and d) determining a sample grid $r_* = \arg\min_r \mu(r)$.

BRIEF DESCRIPTION OF THE DRAWINGS

A more complete understanding of the present invention and benefits thereof may be acquired by referring to the follow description taken in conjunction with the accompanying drawings in which:

FIGS. 3a-3d illustrate plots as described in Example 1.
FIGS. 4a-4c illustrate plots as described in Example 1.
FIGS. 7a-7e illustrate plots as described in Example 2.
FIGS. 10a-10c illustrate plots as described in Example 2.
FIGS. 11a-11b illustrate plots as described in Example 3.
FIGS. 13a-13d illustrate plots as described in Example 3.

DETAILED DESCRIPTION

Figure 1:
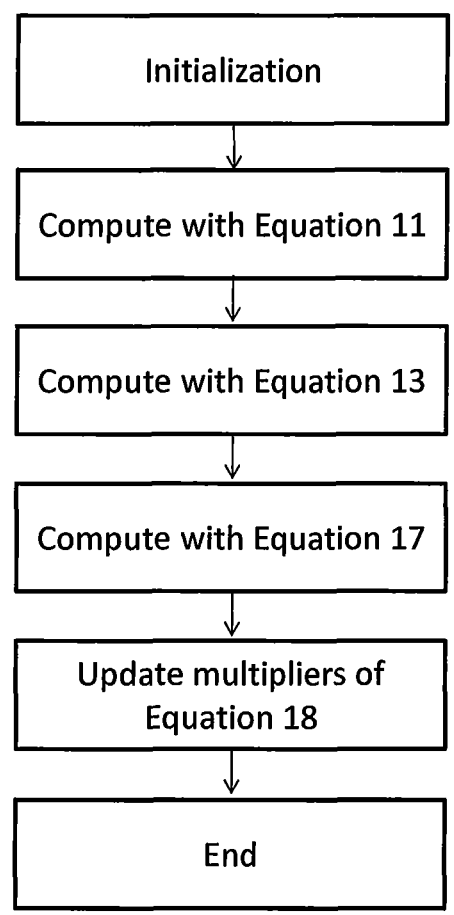
FIG. 1 illustrates an algorithm as described in Example 1.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

Some embodiments of the present invention provide tools and methods for reconstructing seismic data utilizing compressive sensing. Convex optimization models used for reconstructing seismic data can fall under at least two categories: synthesis-based convex optimization model and analysis-based convex optimization model (Candes et al., 2008). As used herein, the term "convex optimization problem" and its related terms such as "convex optimization model" generally refer to a mathematical programming problem of finding solutions when confronted with conflicting requirements (i.e., optimizing convex functions over convex sets).

Some embodiments of the present invention provides tools and methods for optimizing the analysis-based convex optimization model. At least one embodiment adapts an alternating direction method (Yang and Zhang, 2011) with a variable-splitting technique (Wang et al., 2008; Li, 2011). This allows a user to take advantage of the structure in the seismic data reconstruction problem to provide a more efficient solution. Other advantages will be apparent from the disclosure herein.

According to one or more embodiments of the present invention, a two-dimensional windowed Fourier transform representation of the data (e.g. Mallat, 2009) may be provided. In some embodiments, an irregular acquisition grid may be provided, which is an additional condition for exact recovery given by compressive sensing theory. The irregularity in seismic data can be quantified by mutual coherence which is a function of the irregular acquisition grid and windowed Fourier transform basis (e.g. Elad et al., 2007).

Some embodiments provide tools and methods for interpolated compressive sensing data reconstruction for recovering seismic data to a regular nominal grid that is independent of the observed trace locations. Advantages include, but are not limited to, 1) one can try distinct nominal grids for data reconstruction after acquisition, and 2) positioning errors occurring during acquisition can be taken into account. Other geophysical methods for seismic data reconstruction can rely on the discrete Fourier transform to allow for the arbitrary relation between observed trace locations and the nominal grid. By contrast, in the present invention, the transform (Fourier or otherwise) is applied to the nominal grid, and the burden of the mismatch between observed trace locations and the nominal grid is shifted to a restriction/sampling operator.

Some embodiments provide tools and methods that derive a mutual coherence proxy applicable to the seismic data reconstruction problem. At least one advantage is that this proxy is efficient to compute. More particularly, it is the maximum non-d.c. component of the Fourier transform of the sampling grid. A greedy optimization algorithm (e.g. Tropp, 2004) is used to find an optimal sampling grid, with the mutual coherence proxy giving data independent measure for optimal. The optimization problem is typically non-convex, and so the greedy algorithm finds a locally optimal solution that depends on how the algorithm is initialized.

EXAMPLE 1

Data Reconstruction Model

For data reconstruction, a system is defined, wherein (Herrmann, 2010), $$b=RS^*x, \quad x=Su, \qquad (1)$$

where b is observed seismic data, and u is reconstructed seismic data. Matrix R is a restriction (i.e. sampling) operator, mapping from the reconstructed seismic data to the observed seismic data. If S is an appropriately chosen dictionary, then x is a sparse representation of u. For most over-complete dictionaries, such as a wavelet, curvelet and windowed Fourier transforms, $$S^*S=I \qquad (2)$$

Optimization Models

Given the over-complete linear system in equation 1, and observed data b, solution(s) to the reconstructed data u are computed. A frequently used approach from compressive sensing is to solve either basis pursuit (BP) optimization model for noise-free observed data, $$\min_x \|x\|_1 \text{ s.t. } RS^*x=b \qquad (3)$$

or the basis pursuit de-noising (BPDN) optimization model for noisy or imperfect observed data, $$\min_x \|x\|_1 \text{ s.t. } \|RS^*x-b\|_2^2 \leq \sigma \qquad (4)$$

where σ is a representative of the noise level in the observed data. For example, if $\tilde{x}$ is the solution to the optimization model in equation 3, then $$\tilde{u}=S^*\tilde{x} \qquad (5)$$

are reconstructed data. In solving either the BP or BPDN model, an assumption may be made that the reconstructed data u have a sparse representation under the dictionary S. Solving the optimization models in equations 3 and 4 is often referred to as synthesis-based $l_1$ recovery (Candes et al., 2008). SPGL1, as proposed by van den Berg and Friendlander (2008), and based on an analysis of the Pareto curve, is one of the most efficient of these methods.

An alternative to the synthesis-based optimization models are analysis-based optimization models for both the noise-free case, $$\min_u \|Su\|_1 \text{ s.t. } Ru=b \qquad (6)$$

and the noisy case, $$\min_u \|Su\|_1 \text{ s.t. } \|Ru-b\|_2 \leq \sigma \qquad (7)$$

Solving the optimization models in equations 6 and 7 is called analysis-based $l_1$ recovery (Candes et al., 2008). When the dictionary S is orthonormal, synthesis- and analysis-based models are theoretically equivalent. However, according to Candes et al. (2008), when S is overcomplete analysis based optimization models involve fewer unknowns and are computationally easier to solve than their synthesis-based counter-parts. Additionally, analysis-based reconstruction may give more accurate solutions than those obtained from synthesis-based reconstruction (Elad et al., 2007).

Alternating Direction Algorithm with Variable Splitting

The SeisADM algorithm performs analysis-based $l_1$ recovery based on the optimization model in equation 7. SeisADM is based on the alternating direction method (e.g. Gabay and Mercier, 1976; Glowinski, 1984; Yang and Zhang, 2011). The alternating direction method (ADM) has been widely used to solve inverse problems. It is known as a robust and stable iterative algorithm, but is usually very costly due to its estimation of the gradient for each iteration. Here, a variable splitting technique in combination with ADM is introduced, which utilizes the structure of the seismic data reconstruction model to find an efficient method for solving the optimization model in equation 7. In particular, the fact that $S^*S=I$, and that $R^*R$ is a diagonal matrix are utilized. A similar algorithm can be derived for the noise-free case (equation 6) as well.

Starting from equation 7, splitting variables w=Su is introduced to separate the operator S from the non-differentiable $l_1$ norm, and v=Ru−b to form a $l_2$-ball constrained optimization problem (we only need to introduce one splitting variable w to solve the noise-free model (equation 6)). Therefore, equation 7 is equivalent to, $$\min_{u,w,v} \|w\|_1 \text{ s.t. } w=Su, \; v+b=Ru, \; \|v\|_2 \leq \sigma \qquad (8)$$

Ignoring the $l_2$-ball constraint ($\|v\|_2 \leq \sigma$), equation 8 has the corresponding augmented Lagrangian function (Gabay and Mercier, 1976), $$L_A(w, u, v) = \qquad (9)$$
$$\|w\|_1 - \gamma^*(Su - w) + \frac{\beta}{2}\|Su - w\|_2^2 - \lambda^*(Ru - b - v) + \frac{\mu}{2}\|Ru - b - v\|_2^2$$

where γ and λ are Lagrange multipliers, and β and μ are scalars. SeisADM finds the minimum of the equivalent model in equation 8. It does so by minimizing the augmented Lagrangian function in equation 9 with respect to, separately, w, u and v, and then updating the Lagrange multipliers, γ and μ.

For constant u and v, the w-subproblem is, $$\min_w \left\{ \|w\|_1 - \gamma^*(Su - w) + \frac{\beta}{2}\|Su - w\|_2^2 \right\} \qquad (10)$$

Equation 10 is separable with respect to each $w_i \in w$ and has the closed-form solution (e.g. Li, 2011), $$\overset{\square}{w} = \max\left\{\left\|Su - \frac{\gamma}{\beta}\right\|_1 - \frac{1}{\beta}, 0\right\} \text{sgn}\left(Su - \frac{\gamma}{\beta}\right) \quad (11)$$

where sgn (x) is 1 for x>0, 0 for x=0, and −1 for x<0.

For constant w and v, the u-subproblem is, $$\min_u \left\{-\gamma^*(Su-w) + \frac{\beta}{2}\|Su-w\|_2^2 - \lambda^*(Ru-b-v) + \frac{\mu}{2}\|Ru-b-v\|_2^2\right\} \quad (12)$$

Equation 12 is quadratic, with the corresponding normal equations, $$(\beta S^*S + \mu R^*R)\tilde{u} = S^*(\beta w + \gamma) + R^*(\mu b + \mu v + \lambda) \quad (13)$$

Since S*S=I and R*R is a diagonal matrix, one can explicitly and efficiently solve equation 13.

For constant w and u, the v-subproblem is, $$\min_v \left\{-\lambda^*(Ru-b-v) + \frac{\mu}{2}\|Ru-b-v\|_2^2\right\} \quad (14)$$
$$\text{s.t. } \|v\|_2 \leq \sigma$$

The value of v found from solving equation 14 is equivalent to that found from solving, $$\min_v \left\|(Ru-b-v) - \frac{\lambda}{\mu}\right\|_2^2 \text{ s.t. } \|v\|_2 \leq \sigma \quad (15)$$

Further, if $$\theta = Ru - b - \frac{\lambda}{\mu} \quad (16)$$

then it can be shown that the explicit solution of equation 15 is, $$\tilde{v} = \left\{\theta, \text{ if } \|\theta\|_2 \leq \sigma, \sigma \frac{\theta}{\|\theta\|_2}, \text{ otherwise}\right\} \quad (16)$$

The SeisADM algorithm is iterative, where for each iteration $\gamma$ and $\lambda$ are held constant, and the minimum ($\tilde{u}$, $\tilde{v}$, $\overset{\square}{w}$) of the three sub-problems described above are found. At the end of each iteration, the Lagrange multipliers (Glowinski, 1984) is updated, $$\{\tilde{\gamma} = \gamma - \xi\beta(Su-w), \tilde{\lambda} = \lambda - \xi\mu(Ru-b-v)\} \quad (17)$$

Provided that $$0 < \xi < \frac{1+\sqrt{5}}{2};$$

the theoretical convergence of ADM can be guaranteed. Putting all the components together, our algorithm for solving the analysis-based denoising model (equation 7) is summarized in FIG. 1.

Numerical Results

Two tests are performed and reported in this section to demonstrate the analysis-based $l_1$ recovery and efficiency of SeisADM. Specifically, SeisADM is compared with SPGL1. In an effort to make comparisons fair, an effort can be made to optimally tune parameters for both SeisADM and SPGL1.

Synthetic Data Example

For a synthetic example, data generated from the receivers and 7.62 m between adjacent receivers is used. 111 data reconstruction simulations were run, where for each simulation the size of the set of observed traces changes, ranging from 8% to 50% of the total number of reconstructed traces.

Figure 2:
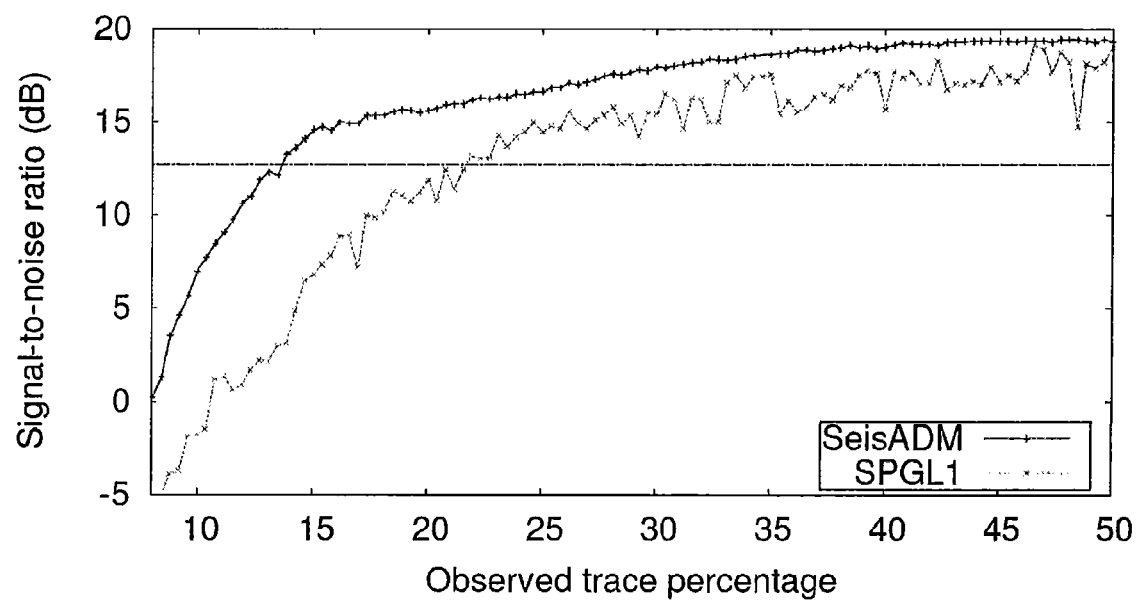
FIG. 2 illustrates a plot as described in Example 1.

The results are shown in FIG. 2 which plots the signal to-noise ratio as a function of the percentage of reconstructed traces that are in the observation set. Results for both synthesis-based $l_1$ recovery (using SPGL1), and analysis based $l_1$ recovery (using SeisADM) are shown. In addition, the horizontal line in FIG. 2 is the signal-to-noise ratio in the original data. The signal-to-noise ratio values in FIG. 2 are computed as a function of the reconstructed and noise-free data, and where the noise-free data are produced from the finite difference simulation.

FIGS. 3a-3d plot (for a small window of time and receivers) reconstruction results for when the number of observed traces is 15% of the number of the reconstructed traces. In particular, FIG. 3a is the finite difference simulated data on the reconstruction grid (i.e. the true result), FIG. 3b is the set of observed traces, FIG. 3c is the synthesis-based $l_1$ reconstruction result, and FIG. 3d is the analysis-based $l_1$ reconstruction result. Finally, the computation time to produce the synthesis-based result using SPGL1 was 95 s, while the computation time to produce the analysis-based result using SeisADM was 64 s.

FIG. 2 shows that when the number of observed traces is less than 20% of the number of reconstructed traces, analysis-based $l_1$ recovery using SeisADM provides significantly higher quality (i.e. higher signal-to-noise ratio) than synthesis-based $l_1$ recovery using SPGL1. From FIGS. 3a-3d, qualitatively less noise was observed, for example, in the central part, in the SeisADM result compared to the SPGL1 result.

Real Data Example

For a real data example, data that were collected with a two-dimensional ocean bottom node acquisition geometry was used. The survey was, specifically, designed in such a way that the shots are recorded on an irregular acquisition grid. The observed data are reconstructed to a regular shot grid with 3105 shot points and 6.25 m between adjacent shots. The observed data for reconstruction are comprised of 564 of these 3105 shot points, giving a set of observed shots that is approximately 18% of the reconstructed shot points. The results are for a single ocean bottom node (common receiver gather).

Figures 5, 5A, 5B, 5C:
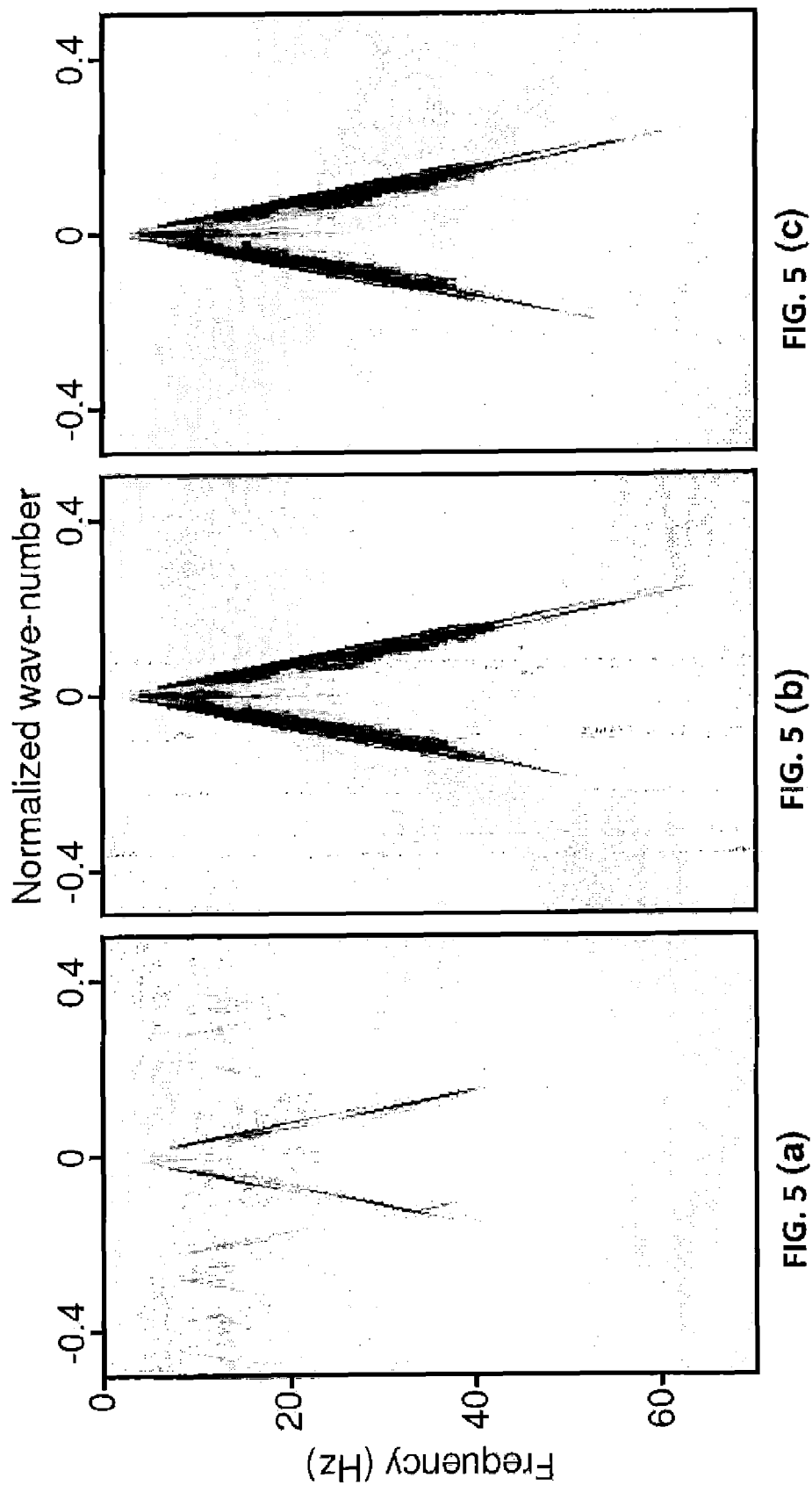
FIGS. 5a-5c illustrate Fourier spectra as described in Example 1.

FIG. 4a-4c show for a small window of shot points and time, common receiver gathers. In particular, FIG. 4a plots the observed data on the 6.25 m grid. FIG. 4b is the reconstruction result using the synthesis-based optimization model and the SPGL1 method, and FIG. 4c is the reconstruction result using the analysis-based optimization model and the SeisADM method. The seismic event at approximately 3.9 s is believed to be of higher quality in the analysis-based result (FIG. 4c) as compared to the synthesis-based result. In FIGS. 5a-5c, the corresponding f-k spectra of the data and reconstructions are plotted. In particular, FIG. 5a is the Fourier spectrum of the data, FIG. 5b is the Fourier spectrum of the synthesis-based result, and FIG. 5c is the Fourier spectrum of the analysis-based result. The run-time for the synthesis-based result using SeisADM was 446 s compared to a run-time of 1349 s for the analysis-based result using SPGL1. The f-k spectrum of the SeisADM result appears to contain less aliased energy than the f-k spectrum of the SPGL1 result.

Conclusions

In this Example, the seismic data reconstruction problem using compressive sensing was considered. In particular, the significance of the choice of the optimization model, being either synthesis- or analysis-based was investigated. The analysis-based $l_1$ recovery gave more accurate results than synthesis-based $l_1$ recovery. A new optimization method for analysis-based $l_1$ recovery, SeisADM was introduced. SeisADM takes advantage of the properties of the seismic data reconstruction problem to optimize its efficiency. The SeisADM method (used for analysis-based $l_1$ recovery) required less computation time and behaved more robust, as compared to the SPGL1 method (used for synthesis based $l_1$ recovery). While the application of SeisADM was to the reconstruction of one spatial dimension, this method may be extended to multi-dimensional data reconstruction problems.

EXAMPLE 2

First, the grids used in this Example are defined: 1) the observed grid is an irregular grid on which seismic data are acquired (i.e. observed trace locations), 2) the nominal grid is a regular grid on which seismic data are reconstructed, and 3) the initial grid is a regular grid from which the observed grid is selected using, for example, a jittered sampling scheme.

Traditionally, it is assumed that the initial grid is identical to the nominal grid, and the observed grid lies on a random or jittered subset of the nominal grid. Under these settings, the model from Herrmann and Hennenfent (2008) may be utilized, $$b=Ru, \quad x=Su \quad (18)$$

where $b=[b_1, \ldots, b_m]^T$ are observed or acquired seismic data, and $u=[u_1, \ldots, u_n]^T$ (m n<n) are data on the nominal grid (i.e., the true data). Each of $b_i$ and $u_i$ represents a seismic trace. The operator S is an appropriately chosen dictionary which makes Su sparse or approximately sparse, and R is a restriction/sampling operator which maps data from the nominal grid to the observed grid. Specifically, R is composed by extracting the corresponding rows from an identity matrix. One can recover u by solving an analysis-based basis pursuit denoising model (Cand'es et al., 2008), $$\min_u \|Su\|_1 \text{ s.t. } \|Ru-b\|_2 \leq \sigma \quad (19)$$

where s corresponds to the noise level of the observed data. Many algorithms have been developed to solve this model or its variants, such as SPGL1 (van den Berg and Friendlander, 2008), NESTA (Becker et al., 2009), and YALL1 (Yang and Zhang, 2011).

Interpolated Compressive Sensing

If the observed grid is independent of the nominal grid, then the nominal grid can be determined after data acquisition. To generalize the idea of compressive sensing seismic data reconstruction, the fact that seismic data can be well approximated, locally, using a kth-order polynomial on a regular grid is utilized. For example, k=1 if the seismic data are linear in a local sense. For the sake of clarity, reconstruction of seismic data is shown along one spatial dimension, but the method can be easily extended to higher dimensions.

Denoted are the true locations on the observed grid as $p_1, \ldots, p_m$ and the true locations on the nominal grid as $l_1, \ldots, l_n$. For j=1, \ldots, m and k<<n, $$s_j \square \text{argmin}_{s \in \{1, \ldots, n-k\}} \prod_{i=0}^{k} |p_j - l_{s+i}| \quad (20)$$

This is easy to solve due to the fact that $l_1, \ldots, l_n$ are equally spaced. When $p_j$ is not close to the boundary of the nominal grid, $$l_{s_j + \lfloor k/2 - 1 \rfloor} \leq p_j \leq l_{s_j + \lfloor k/2 \rfloor + 1} \quad (21)$$

Based on the assumption made at the beginning of this section, given $u_{s_j}, \ldots, u_{s_j+k}$ for any j=1, \ldots, m, $b_j$ can be well approximated using kth-order Lagrange interpolation (e.g. Berrut and Trefethen, 2004); i.e., $$b_j \square \sum_{i=0}^{k} L_{j,s_j+i} u_{s_j+i} \quad (22)$$

where, $$L_{j,s_j+i} = \prod_{h=0, h \neq i}^{k} \left( \frac{p_j - l_{s_j+h}}{l_{s_j+i} - l_{s_j+h}} \right) \quad (23)$$

Supposing that u(x) denotes the continuous seismic data in some local window, and u(x) is at least k+1 times continuously differentiable. According to the Taylor expansion, the error estimation of Lagrange interpolation is $$|e_j| = \frac{|u^{(k+1)}(\xi_j)|}{(k+1)!} \prod_{i=0}^{k} |p_j - l_{s_j+i}| \quad (24)$$

for some $l_{s_j} \leq \xi_j \leq l_{s_j+k}$. This also implies the choice of $s_j$ as defined in equation 3.

Inspired by equation 5, interpolated restriction operator is $$\tilde{R} = \begin{pmatrix} \tilde{r}_{1,1} I & \cdots & \tilde{r}_{1,n} I \\ \vdots & \ddots & \vdots \\ \tilde{r}_{m,1} I & \cdots & \tilde{r}_{m,n} I \end{pmatrix} \quad (25)$$

where, $$\tilde{r}_{j,i} = \{L_{j,i}, \text{ if } s_j \leq i \leq s_j + k, 0, \text{ otherwise} \quad (26)$$

and the size of the identity matrix I is decided by the number of time samples. Then equation 22 can be rewritten as, $$b \square \tilde{R} u \quad (27)$$

This demonstrates an embodiment of the interpolated compressive sensing model for seismic data reconstruction. Analogous to equation 19, u can be recovered by solving the following optimization problem, $$\min_u \|Su\|_1 \text{ s.t. } \|\tilde{R} u - b\|_2 \leq \sigma \quad (28)$$

One should note that the method described above is fundamentally different from the method which first interpolates the observed data back to nearest points on the nominal grid and then reconstructs using traditional compressive sensing. The proposed method utilizes the unknown data on the nominal grid as an interpolation basis to match the observed data and forms an inverse problem to recover the unknown data. Theoretically, the interpolation error is $O(\Delta h^{k+1})$ where $\Delta h$ is the average spacing of the interpolation basis. Since the nominal grid is much finer than the observed grid (i.e., smaller average spacing), interpolated compressive sensing is expected to be more accurate than first interpolating followed by reconstructing. Moreover, for interpolated compressive sensing, the error could be further attenuated by solving a BP denoising problem such as in equation 28 (Cand'es et al., 2008).

The computational cost is usually dominated by evaluating $\bar{R}^T \bar{R} u$ and $S^T S u$ at each iteration, which is approximately $O(kN)$ and $O(N \log N)$ respectively, assuming S has a fast transform (N is the number of samples). Therefore, for seismic data reconstruction, the computational cost for solving the interpolated compressive sensing problem in equation 28 is comparable to solving the traditional compressive sensing problem in equation 19 when $k \ll N$. As the order k increases, the accuracy of reconstruction may become higher at the cost of increasing computational burden.

If $k=1$ in equation 22, then our method is called linear-interpolated compressive sensing. Likewise, if $k=3$, our method is called cubic-interpolated compressive sensing. In our tests, linear- and cubic-interpolated compressive sensing give comparable and satisfactory reconstruction results. The case $k>3$ may only apply to few extreme cases. The following data examples focus on the linear- and cubic-interpolated compressive sensing data reconstruction.

Synthetic Data Example

In order to simulate the scenario that the nominal grid does not necessarily include the observed grid, and also be able to do quantitative analysis, start with a finer initial grid for jittered sampling, and select a uniform subset from the initial grid as the nominal grid for reconstruction and computing signal to-noise ratios. The $l_1$ solver used to solve the problem in equation 28 is based on the alternating direction method proposed by Yang and Zhang (2011). Specifically, the results from two special cases—linear and cubic—of the proposed interpolated compressive sensing with the results from traditional compressive sensing are compared. In an effort to make fair numerical comparisons, the same solver for both traditional and interpolated compressive sensing is used.

For the synthetic example, data generated from the Sigsbee 2a model (Bergsma, 2001) and a two-dimensional acoustic finite-difference simulation are considered. For each common receiver gather, the data are reconstructed to a nominal grid with 306 shot points, with a spacing of 22:89 m between adjacent shot points. The observed shot points are selected from a regular shot point grid with 7:62 m spacing using a jittered algorithm (Hennenfent and Herrmann, 2008). Experiments were performed where the number of observed shot points varies from 15% to 50% of the 306 grid points on the nominal grid. There was a mismatch between the nominal grid for reconstruction and the initial grid used to generate the observations; therefore, an observed shot-point does not necessarily correspond to any given point on the reconstruction grid, making the interpolated compressive sensing method applicable.

Figure 6:
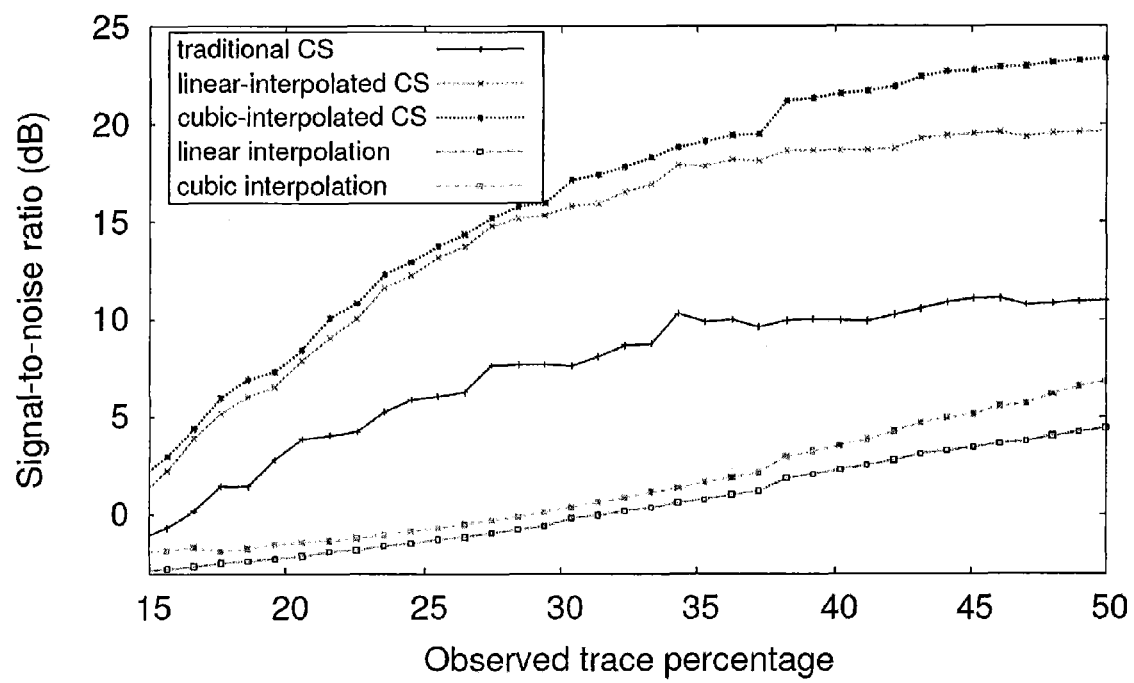
FIG. 6 illustrates a plot as described in Example 2.

The signal-to-noise ratios for reconstruction results is shown in FIG. 6 for traditional compressive sensing (with nearest neighbor resampling), linear-interpolated compressive sensing, and cubic-interpolated compressive sensing. For reference, data reconstruction results for linear and cubic interpolation are shown, but without the use of compressive sensing data reconstruction. For each data point in FIG. 6, an average signal-to-noise ratio computed from performing 20 data reconstructions, each on a different common receiver gather may be used. FIGS. 7a-7e show data reconstruction results for a small window of source points and time of a common receiver gather when there are 108 traces in the observed common receiver gather (35% of the reconstructed traces). In particular, FIG. 7a shows data on the nominal reconstruction grid, computed using the finite-difference simulation, and FIG. 7b shows the observed data used for reconstruction. The remaining sections in FIG. 7 show data reconstruction results for traditional compressive sensing (FIG. 7c), linear-interpolated compressive sensing (FIG. 7d), and cubic-interpolated compressive sensing (FIG. 7e).

A qualitative inspection of FIG. 7, confirms the quantitative results shown in FIG. 6. Namely that linear- and cubic-interpolated compressive sensing data reconstruction perform similarly, and, for this scenario, provides a large uplift in the signal-to-noise ratio as compared to traditional compressive sensing data reconstruction. In addition, all types of compressive sensing data reconstruction outperform data reconstruction using linear and cubic interpolation.

Real Data Example

Marine data was used which were collected by shooting in an irregular acquisition pattern and recorded with a two-dimensional ocean bottom node acquisition geometry. Two reconstruction experiments using this dataset were utilized. In the first, the observed data are reconstructed to a nominal shot grid with 2580 shot points and 7:5 m spacing between adjacent shots. In the second, the observed data are reconstructed to a nominal shot grid with 2037 shot points and 9:5 m spacing between adjacent shots. The observed data for reconstruction are comprised of 400 shot points that are selected from an initial grid with 6:25 m spacing between adjacent shots points, and 3096 grid points. Similar to the synthetic example, there is a mismatch between the nominal grids for reconstruction, and the initial grid used to collect the data. Therefore, as before, an observed shot point does not necessarily correspond to any given point on the nominal grid.

Figure 8:
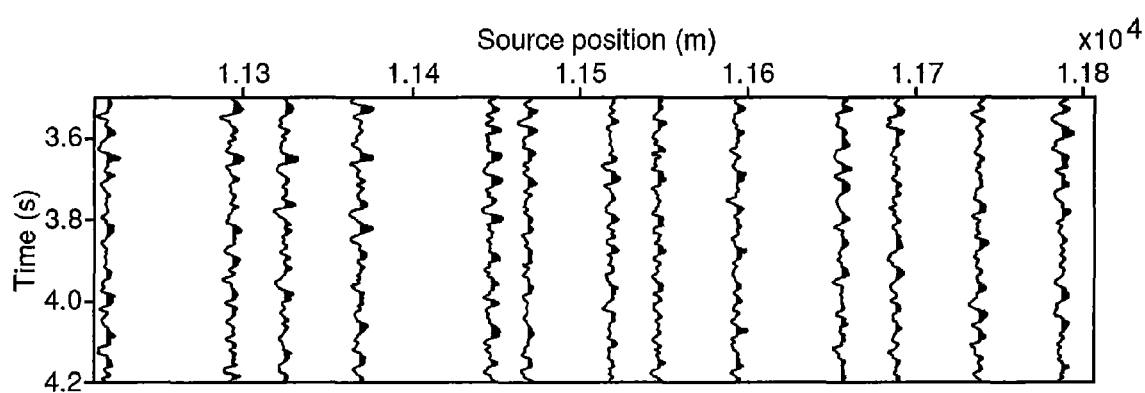
FIG. 8 illustrates a plot as described in Example 2.
Figure 9A:
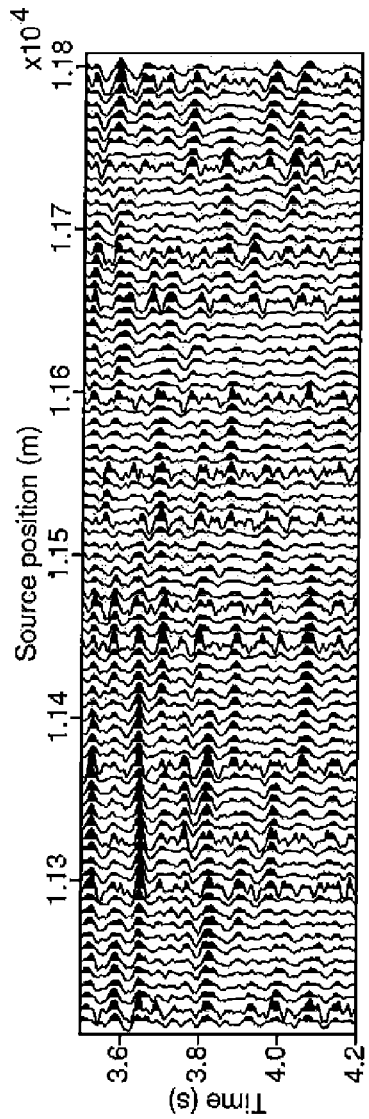
FIGS. 9a-9c illustrate plots as described in Example 2.
Figure 9B:
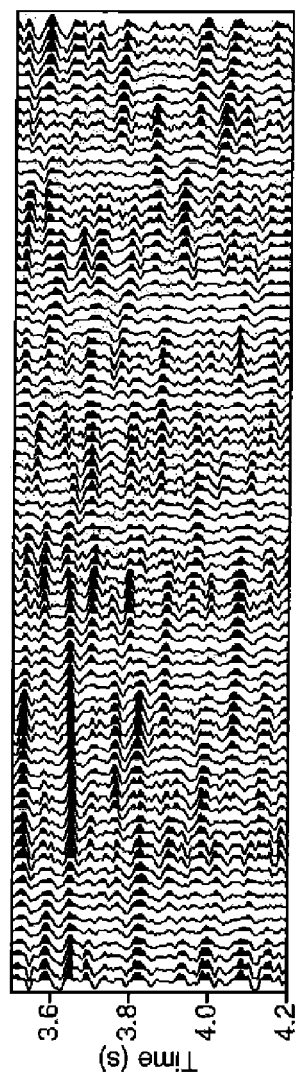
Figure 9C:
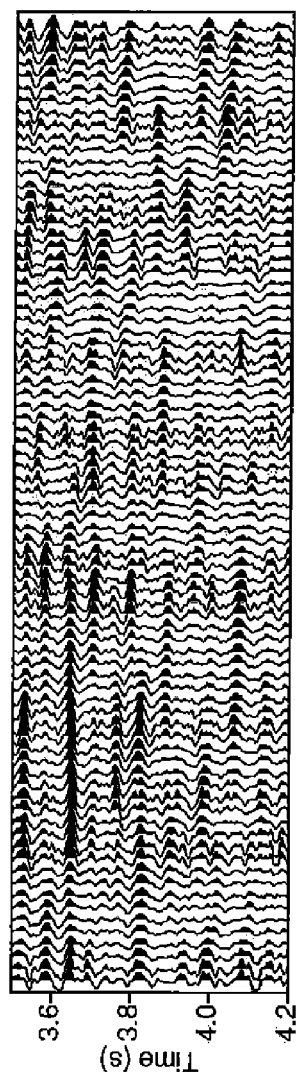

FIG. 8 shows the acquired data for a small window of time and source points. Reconstruction results are shown for the 7:5 m nominal grid in FIGS. 9a-9c for the same window of time and source points. In particular, traditional (FIG. 9a), linear-interpolated (FIG. 9b), and cubic-interpolated (FIG. 9c) compressive sensing data reconstruction results are shown. Similarly, the results for the 9:5 m nominal grid within the same window of time and source points are shown in FIG. 10a-10c, where the traditional, linear-interpolated, and cubic-interpolated compressive sensing data reconstruction results are shown in FIGS. 10a, 10b and 10c respectively.

Even though the seismic data are reconstructed to different nominal grids with different spacing, the results shown in FIGS. 9 and 10 are consistent with each other. In both cases, although the effect is subtle, the seismic data recovered using interpolated compressive sensing show less acquisition footprint. Besides, the expression of the seismic events now, for instance, in the lower right hand corner seems more geologically plausible than the traditional compressive sensing result might suggest.

Conclusions

A novel data reconstruction method, interpolated compressive sensing has been developed. The method allows for a mismatch between the nominal grid that the data are reconstructed to, and the observed grid upon which the data are acquired. This method allows for any dictionary, used in the compressive sensing data reconstruction model, to be applied to the regular nominal grid. The relationship between the observed and nominal grids is given by the interpolated restriction operator. The interpolated restriction operator, in turn, accounts for both the reduced size of the observed grid, and for when a point on the observed grid does not correspond to a nominal grid point. The latter is done by incorporating Lagrange interpolation into the restriction operator. The interpolated compressive sensing method was applied to both synthetic and real data examples, incorporating both 1st and 3rd order Lagrange interpolation into the interpolated restriction operator. The synthetic results compare linear- and cubic-interpolated compressive sensing to traditional compressive sensing, showing a significant increase in the signal-to-noise ratio of the reconstructed data. Finally, the method was applied to a real data example, and observed an uplift in quality as compared to traditional compressive sensing.

EXAMPLE 3

This example finds the optimal sampling grid in a seismic data reconstruction problem. The seismic data reconstruction model can be described as (e.g. Herrmann, 2010), $$b = Dx, \ D = RS^*, \ x = Su \tag{29}$$

where b are seismic data on the observed grid, and u are data on the reconstruction grid (i.e. the true data). The matrix R is a restriction (i.e. sampling) operator, and maps data from the reconstruction grid to the observed grid. If S is a suitably chosen, possibly over-complete, dictionary, then x will have small cardinality (i.e. $l_0$-norm).

Compressive Sensing Optimization Model and Mutual Coherence

Given the under-determined system in equation 29 and the data b, the reconstructed seismic data u is found by solving an analysis-based basis pursuit denoising optimization model (e.g. Cand'es et al., 2008), $$\min_u \|Su\|_1 \text{ s.t. } \|Ru-b\|_2 \leq \sigma \tag{30}$$

There are many algorithms that can be employed to find the solution of the optimization model in equation 30. In this Example, a variant (Li et al., 2012) of the alternating direction method (e.g. Yang and Zhang, 2011) is used. At least one goal is to design R (i.e. the sampling grid) such that for a given b and S, u is more likely to be recovered successfully.

Compressive sensing provides theorems that give conditions for a successful data reconstruction. For the moment, we consider the following scenario: 1) $S \in R^{n \times n}$ is an orthonormal matrix, 2) $R \in R^{m \times n}$ with n>m, 3) $D=RS^*$ is such that D is a selection of m rows from $S^*$, and 4) $D=RS^*$ is such that the columns of D, $d_i$, have unit energy ($\|d_i\|_2=1$, i=1 ... n). Under this scenario, solving the optimization program in equation 30 recovers u successfully with overwhelming probability when (Cand'es et al., 2006), $$\mu \leq \sqrt{\frac{C}{S} \frac{m}{(\log n)^6}} \tag{31}$$

In equation 31, C is a constant, and S is the cardinality of Su. Importantly, for our analysis, μ is the mutual coherence and is a function of S and R. In particular (Donoho and Elad, 2002), $$\mu(R,S) = \max_{i \neq j} |d^*_i d_j|, \ i,j=1 \ldots n \tag{32}$$

This is equivalent to the absolute maximum off-diagonal element of the Gram matrix, $G=D^*D$. Within the context of the seismic data reconstruction problem, n is proportional to the number of seismic traces on the reconstruction grid, and m is proportional to the number of traces on the observed grid. Therefore, if S and C are constant, then for a given number of observed traces, decreasing m increases the chance of a successful data reconstruction.

The relation between mutual coherence (equation 32) and the condition for exact recovery (equation 31), make its analysis appealing. Unfortunately, for problems in seismic data reconstruction it would be prohibitively expensive to compute. However, if S is the discrete Fourier transform matrix, then one can find an efficient method to compute mutual coherence, and use this as a mutual coherence proxy for when S is some over-complete (but perhaps still Fourier derived dictionary such as the windowed Fourier transform.

To derive the mutual coherence proxy, one may begin by following Hennenfent and Herrmann (2008), and note that for the seismic data reconstruction model, R*R is a diagonal matrix with its diagonal being the sampling grid, $$r = [r_1 \ r_2 \ \ldots \ r_n] \tag{33}$$

hence, $$[R^*RS^*]_{i,j} = \sum_{k=1}^{n} [R^*R]_{i,k} [S^*]_{k,j} = r_i [S]_{i,j} \tag{34}$$

and the Gram matrix is, $$[G]_{i,j} = [D^*D]_{i,j} = [SR^*RS^*]_{i,j} = \sum_{k=1}^{n} [S]_{i,k} [S^*]_{k,j} r_k \tag{35}$$

If S is a discrete Fourier transform matrix, then $[S]_{i,j} = \omega^{ij}$ where $\omega = \exp(-2\pi\sqrt{-1}/n)$, and from equation 35, $$[G]_{i,j} = [D^*D]_{i,j} = \sum_{k=1}^{n} r_k \omega^{k(i-j)} \tag{36}$$

Equation 36 shows that off-diagonal elements of the Gram matrix are equal to the non-d.c. components of the Fourier transform of the sampling grid r. Therefore, $$\mu(r) = \max_{l \neq 0} |\hat{r}_l| = \max_{l \neq 0} \left| \sum_{k=1}^{n} r_k \omega^{kl} \right| \tag{37}$$

where $\hat{r}_l$ are Fourier transform coefficients. Equation 37 can be computed efficiently using the fast Fourier transform, and is our mutual coherence proxy. It is exactly the mutual coherence when S is the Fourier transform, and a proxy for mutual coherence when S is some over-complete dictionary.

Greedy Optimization Algorithm for Acquisition Design

Given the mutual coherence in equation 37, a sampling grid r according to the optimization program is $$r_* = \arg\min_r \mu(r) \quad (38)$$

where $\mu$ is given by equation 37. The optimization program in equation 38 is non-convex. To find its solution, a randomized greedy algorithm is proposed. One can think of it as a deterministic alternative to the statistical result found in Hennenfent and Herrmann (2008). The algorithm will find a local minimum, and, therefore, does not guarantee convergence to a global minimum. However, in practice, it has been observed that solutions finding a local minimum using our randomized greedy algorithm are sufficient.

The randomized greedy algorithm for solving equation 38 is shown in Algorithm 1. The algorithm is initialized using a regular sampling grid, where the spacing of the regular grid is $\Delta r=n/m$, so that for any integer $j \in \{0, 1, \ldots, m-1\}$, the elements of r (equation 33) are, $$r_i = \{1, i=j\Delta r+1 \; 0, i \neq j\Delta r+1\} \quad (39)$$

and where for the sake of simplicity in our description, one can assume that n is an integer multiple of m. Dividing the reconstruction grid into m disjoint subsets of size $\Delta r$ grid points, and where the jth subset is, $$s_j = \{j\Delta r - \lfloor \Delta r/2 \rfloor + k | k=1 \ldots \Delta r\} \quad (40)$$

where $\lfloor x \rfloor$ denotes integer component of x. In other words, except at the boundaries of the grid, the jth subset is centered on the jth grid point of the regular observed grid. The ordered sets $s_j$ are stored in I, and we store a corresponding random ordering of these sets using J=PI, and where P is a random perturbation matrix. The algorithm sequentially steps through the sets in J, and uses a jittering technique so that for each of the $\Delta r$ elements in $s_j$, its corresponding grid point is set to 1 while all others are set to 0, producing a new sampling grid $r_k$. Subsequently, the mutual coherence $\mu_k = \mu(r_k)$ is computed using equation 37, and compared to the mutual coherence of r. If a perturbation, $$k_* = \arg\min_k \mu(r_k) \quad (41)$$

on r is found that reduces the mutual coherence, then r is set to $r_{k_*}$ before iterating to the next set $s_j \in J$. Hence, the algorithm runs in a fixed number of iterations equal to $m\Delta r$, and where the expense at each iteration is dominated by the computation of the mutual coherence of the sampling grid computed via the fast Fourier transform (equation 37). Therefore, the total expense of the algorithm is $O(n^2 \log n)$.

Algorithm 1 Randomized Greedy Algorithm

```
r ← 0, Δr ← n / m
r_i ← 1, for i = jΔr, j = 0,1...,m - 1
s_j ← {jΔr - ⌊Δr / 2⌋ + k|k = 1...Δr}, j = 0,1,...,m - 1
I ← [s_0 s_1 ... s_{m-1}], J ← PI
for j = 0 → m - 1 do
    s_j ← [J]_j, μ_0 = μ(r), r' ← r
    for ∀k ∈ s_j do
        r_{{s_j}'} ← {0}, r_k' ← 1, μ_k ← μ(r')
    end for
    If min{μ_k} < μ_0 then
        μ_0 ← min{μ_k}, r ← r'
    end if
end for
r* ← r
```

Synthetic Data Example

For a synthetic data example, data generated from the Sigsbee 2a model (Bergsma, 2001), and a two-dimensional acoustic finite difference simulation were used. The data reconstruction of a single common receiver gather, and where 184 observed traces are reconstructed to a regular grid with 920 sources and 7:62 m between adjacent sources were considered. Hence, the observed data has 20% as many traces as the reconstructed data. In the data reconstruction model (equation 29), S was allowed be a two-dimensional windowed Fourier transform.

The results are shown in FIG. 11a-11b which plot the mutual coherence proxy (equation 38) versus the iteration of the randomized greedy algorithm. In total there are 185 iterations, including its initialization to a regular sampling grid. For comparison, a Monte Carlo simulation generated 185 realizations of R where for each row of R, its non-zero column is selected using a random jitter technique with a uniform probability density function.

The Monte Carlo realizations of the restriction operator R give, consistently, small values for their mutual coherence proxy (FIG. 11a), and correspondingly good values for the signal-to-noise ratios of the reconstructed data, as shown in FIG. 11b. This is an expected result, and is shown in Hennenfent and Herrmann (2008). As the greedy optimization algorithm iterates, the mutual coherence approaches and then surpasses the mutual coherence computed from the Monte Carlo realizations. Likewise, the signal-to-noise ratios found from the randomized greedy optimization algorithm approach similar values to those found from the Monte Carlo method. The optimal sampling grid using the greedy algorithm was achieved by jittering 134 of the 184 observations, a result that is not necessarily predicted by the analytic result in Hennenfent and Herrmann (2008). However, both the Monte Carlo and randomized greedy algorithms produced sampling grids that result in successful seismic data reconstructions.

Real Data Example

For the real data example, data that was collected with a two-dimensional ocean bottom node acquisition geometry were used. The survey was, specifically, designed in such a way that the shots are recorded on an irregular acquisition grid. The observed data is reconstructed to a regular shot grid with 3105 shot points and 6:25 m between adjacent shots. The observed data for reconstruction is comprised of 400 of these 3105 shot points, giving a set of observed shots that is approximately 13% of the size of the set of reconstructed shot points. The results for a single ocean bottom node (common receiver gather) is shown. As was the case for the synthetic data example, S was allowed be a two-dimensional windowed Fourier transform.

Figure 12A:
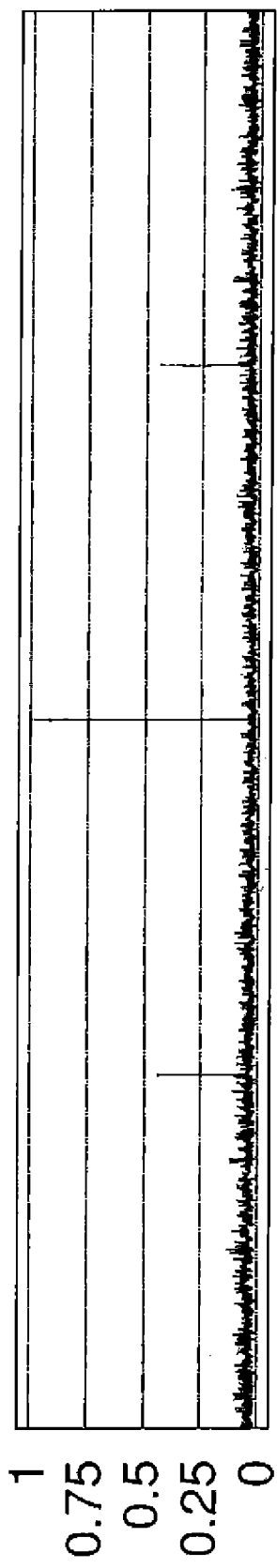
FIGS. 12a-12b illustrate plots as described in Example 3.
Figure 12B:
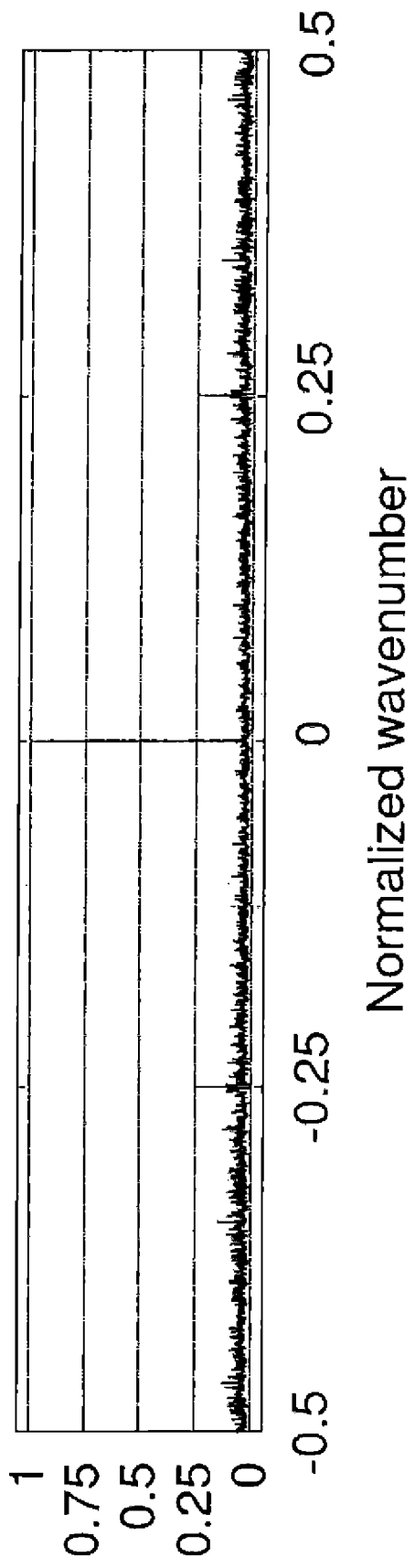

Amplitude spectra of the sampling grids ($|\hat{r}_l|$ in equation 37) are shown in FIGS. 12a-12b. In particular, FIG. 12a shows the Fourier spectrum of a sampling grid with a large mutual coherence proxy ($\mu$=176) and FIG. 12b shows the Fourier spectrum of a sampling grid with a small mutual coherence proxy ($\mu$=99). As expected, the large mutual coherence case corresponds to larger non-d.c. components than the low mutual coherence case. As shown, the f k-spectra of common receiver gathers for the high (FIGS. 13a and 13c) and low (FIGS. 13b and 13d) mutual coherence sampling grids. In particular, FIGS. 13a-13b plot the f k-spectra of the observed data, and FIGS. 3c-d plot the f k-spectra of the reconstructed data. In the f k-spectra of the high mutual coherence case, coherent aliased energy (FIGS. 13a and 13c) was observed. In the low mutual coherence case (FIGS. 13b and 13d), this energy is attenuated.

Figure 14A:
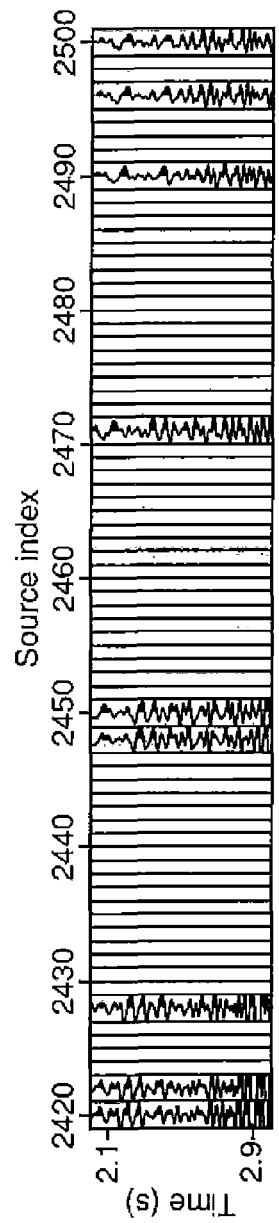
FIGS. 14a-14d illustrate plots as described in Example 3.
Figure 14B:
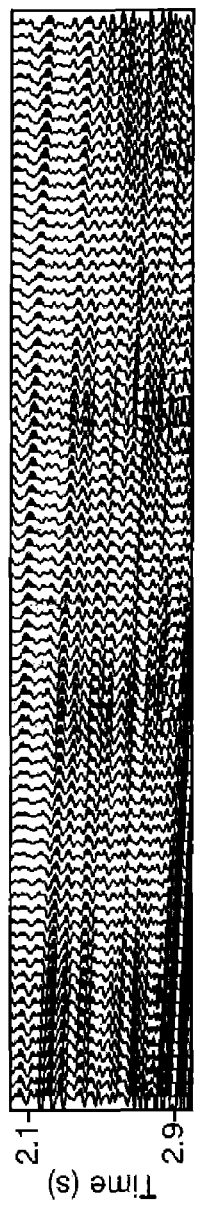
Figure 14C:
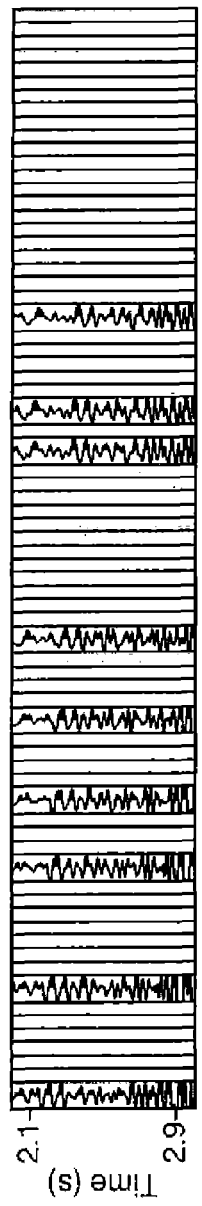
Figure 14D:
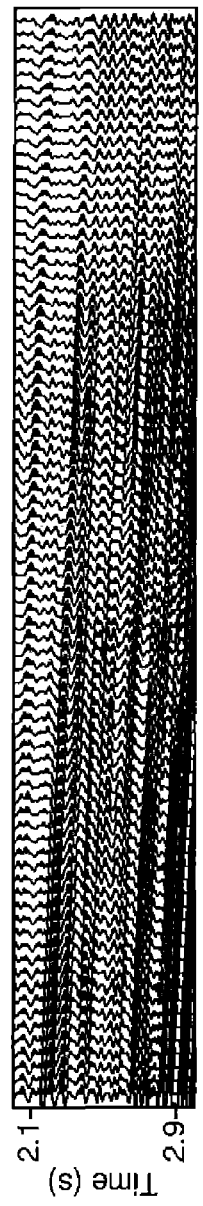

Finally, FIGS. 14a-14d plot a common receiver gather for a small window of time and source points before and after data reconstruction for the low and high mutual coherence sampling grids. In particular, FIGS. 14a-14b plot, respectively, the observed and reconstructed data for the high mutual coherence sampling grid, and FIGS. 14*c*-14*d* plot, respectively, the observed and reconstructed data for the low mutual coherence sampling grid. Qualitatively, the acquisition footprint is easier to see in the high mutual coherence case, as compared to the low mutual coherence case. These observations are consistent with those made on the corresponding f k-spectra (FIG. 13).

CONCLUSIONS

The seismic data acquisition design problem was considered from the point of view of compressive sensing seismic data reconstruction. In particular, mutual coherence and a greedy optimization algorithm was utilized to design an optimal acquisition grid. With the synthetic example, the signal-to-noise ratio and the mutual coherence are anti-correlated. Additionally, the synthetic example showed that the randomized greedy algorithm gave a mutual coherence that is lower than that found from a Monte Carlo simulation. Further, the signal-to-noise ratio of the reconstruction result produced from the optimal grid found through the greedy algorithm is similar to that found from the Monte Carlo simulation, which can be predicted from the work of Hennenfent and Herrmann (2008). Finally, the choice of mutual coherence proxy using a real data example was validated, and where a qualitative analysis of the reconstruction results was made, comparing a low mutual coherence sampling grid and a high mutual coherence sampling grid of the same survey area.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

What is claimed is:

1. A computer-implemented method for determining optimal sampling grid during seismic data reconstruction, the method comprising:
    a) constructing an optimization model, via a computing processor, given by $\min_u \|Su\|_1$ s.t. $\|Ru-b\|_2 \leq \sigma$ wherein S is a discrete transform matrix, b is seismic data on an observed grid, u is seismic data on a reconstruction grid, $\sigma$ represents noise level in observed data, and matrix R is a sampling operator;
    b) defining mutual coherence as $$\mu(r) = \max_{l \neq 0} |\hat{r}_l| = \max_{l \neq 0} \left| \sum_{k=1}^{n} r_k \omega^{kl} \right|$$

wherein r is sampling grid, $\hat{r}_l$ are Fourier transform coefficients, $\omega = \exp(-2\pi\sqrt{-1}/n)$, and n is number of elements in r;
    c) deriving a mutual coherence proxy, wherein the mutual coherence proxy is a proxy for mutual coherence when S is over-complete and wherein the mutual coherence proxy is exactly the mutual coherence when S is a Fourier transform; and
    d) determining a sample grid $r_* = \arg\min_r \mu(r)$.

2. The method of claim 1, wherein the sample grid is determined via randomized greedy algorithm method.

3. The method of claim 2, wherein the randomized greedy algorithm method finds local minimum.

4. The method of claim 1, wherein the sample grid is determined via stochastic global optimization method.

5. The method of claim 1, wherein $r_* = \arg\min_r \mu(r)$ is non-convex.

6. The method of claim 1, wherein the mutual coherence proxy is derived using fast Fourier transform.

* * * * *